(12) United States Patent
Mori

(10) Patent No.: US 12,256,135 B2
(45) Date of Patent: Mar. 18, 2025

(54) OPTICAL SYSTEM AND IMAGE PICKUP APPARATUS HAVING THE SAME

(71) Applicant: CANON KABUSHIKI KAISHA, Tokyo (JP)

(72) Inventor: Takeo Mori, Tochigi (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 65 days.

(21) Appl. No.: 18/186,234

(22) Filed: Mar. 20, 2023

(65) Prior Publication Data

US 2023/0308735 A1 Sep. 28, 2023

(30) Foreign Application Priority Data

Mar. 23, 2022 (JP) .................................. 2022-046855

(51) Int. Cl.
*H04N 23/55* (2023.01)
*G02B 9/08* (2006.01)

(52) U.S. Cl.
CPC .............. *H04N 23/55* (2023.01); *G02B 9/08* (2013.01)

(58) Field of Classification Search
CPC . H04N 23/55; G02B 9/08; G02B 9/64; G02B 13/0045; G02B 13/04; G02B 13/18; G02B 13/0015; G02B 27/0025; G02B 27/005
See application file for complete search history.

(56) References Cited

U.S. PATENT DOCUMENTS

| | | | |
|---|---|---|---|
| 8,587,880 B2 * | 11/2013 | Suzuki | G02B 13/0045 359/716 |
| 8,767,307 B2 | 7/2014 | Nakamura | |
| 9,829,681 B2 | 11/2017 | Mori | |
| 10,101,565 B2 * | 10/2018 | Nagami | G02B 5/005 |
| 10,670,832 B2 | 6/2020 | Mori | |
| 10,887,510 B2 | 1/2021 | Mori | |
| 11,262,563 B2 * | 3/2022 | Kondo | G02B 13/0045 |
| 11,640,048 B2 | 5/2023 | Mori et al. | |
| 2012/0069456 A1 | 3/2012 | Suzuki | |
| 2017/0075089 A1 | 3/2017 | Nagami | |
| 2020/0400919 A1 | 12/2020 | Shinohara et al. | |

(Continued)

FOREIGN PATENT DOCUMENTS

| | | |
|---|---|---|
| JP | H08-122634 A | 5/1996 |
| JP | H10-010425 A | 1/1998 |

(Continued)

OTHER PUBLICATIONS

Notice of Reasons for Refusal issued by the Japanese Patent Office on Apr. 23, 2024 in corresponding JP Patent Application No. 2022-046855, with English translation.

(Continued)

*Primary Examiner* — Ahmed A Berhan

(74) *Attorney, Agent, or Firm* — Carter, DeLuca & Farrell LLP

(57) ABSTRACT

An optical system consists of, in order from an object side to an image side, a front unit, an aperture stop, and a rear unit having positive refractive power as a whole. The rear unit includes a final lens disposed closest to the image side and having positive refractive power. A number of inequalities relating to the spatial relationship between the lenses and their refractive powers are satisfied.

17 Claims, 8 Drawing Sheets

(56) References Cited

U.S. PATENT DOCUMENTS

2020/0409126 A1   12/2020  Minefuji
2022/0334363 A1   10/2022  Okuoka et al.

FOREIGN PATENT DOCUMENTS

| JP | H10-142496 A | 5/1998 |
| JP | 2000-180719 A | 6/2000 |
| JP | 2011-100094 A | 5/2011 |
| JP | 2012-063676 A | 3/2012 |
| JP | 2012-203119 A | 10/2012 |
| JP | 2013-007853 A | 1/2013 |
| JP | 2013-156459 A | 8/2013 |
| JP | 2013-195637 A | 9/2013 |
| JP | 2017-054078 A | 3/2017 |
| JP | 2020-115174 A | 7/2020 |
| WO | 2021/166492 A1 | 8/2021 |

OTHER PUBLICATIONS

Examination Report issued by the UK Patent Office on Jul. 11, 2024 in corresponding GB Patent Application No. 2303868.0.
Notice of Reasons for Refusal issued by the Japanese Patent Office on Dec. 26, 2023 in corresponding JP Patent Application No. 2022-046855, with English translation.
Search Report issued in corresponding GB Patent Application No. 2303868.0, dated Sep. 14, 2023, pp. 1-4.
Combined Search Report and Examination Report issued in corresponding GB Patent Application No. 2418432.7, dated Jan. 29, 2025, pp. 1-6.

\* cited by examiner

OPTICAL SYSTEM AND IMAGE PICKUP APPARATUS HAVING THE SAME

BACKGROUND

Technical Field

One of the aspects of the disclosure relates to an optical system, which is suitable for a digital video camera, a digital still camera, a broadcasting camera, a film-based camera, a surveillance camera, and the like.

Description of the Related Art

Optical systems for use with an image pickup apparatus are commonly required to have compact configurations and high optical performance, as image sensors are required to be smaller and have a larger number of pixels.

Japanese Patent Laid-Open No. (JP) 2020-115174 discloses an optical system that consists of, in order from an object side to an image side, a first lens having positive refractive power, a second lens having negative refractive power, a third lens, a fourth lens, a fifth lens, and a sixth lens.

The optical system disclosed in JP 2020-115174 reduces the overall length through a telephoto-type power arrangement and corrects distortion and curvature of field by using a plurality of aspherical lenses. Since the optical system disclosed in JP 2020-115174 has a large entire Petzval sum is large and an off-axis light beam has a large incident angle, an attempt to apply this optical system to an image pickup apparatus having a large image sensor faces problems in the insufficient correction of the curvature of field and deterioration of a peripheral light amount.

In order to realize an optical system that has a compact configuration and high optical performance, it is important to dispose a large diameter lens having positive refractive power on a side closest to an image plane and to properly set a refractive index of each lens and (refractive) power arrangement.

SUMMARY

One of the aspects of the embodiment provides an optical system that can have a compact configuration and high optical performance, and an image pickup apparatus having this optical system.

An optical system according to one aspect of the disclosure consists of, in order from an object side to an image side, a front unit, an aperture stop, and a rear unit that has positive refractive power as a whole. The rear unit includes a final lens disposed closest to an image plane and having positive refractive power. The following inequalities are satisfied:

$0.5 < TTL/\Phi i < 1.4$ $1.64 < PNdave < 2.00$ $2.0 < \Phi p/sk < 4.0$ where TTL is a distance on an optical axis from a lens surface on an object side of a lens disposed closest to an object in the optical system to the image plane, $\Phi i$ is a diameter of an image circle, PNdave is an average value of refractive indices for d-line of all positive lenses included in the optical system, $\Phi p$ is an effective diameter of a lens surface on the image side of the final lens, and sk is an air conversion length of a distance on the optical axis from the lens surface on the image side of the final lens to the image plane. An image pickup apparatus having the above optical system also constitutes another aspect of the disclosure.

Further features of the disclosure will become apparent from the following description of embodiments with reference to the attached drawings.

DESCRIPTION OF THE EMBODIMENTS

Figure 1:
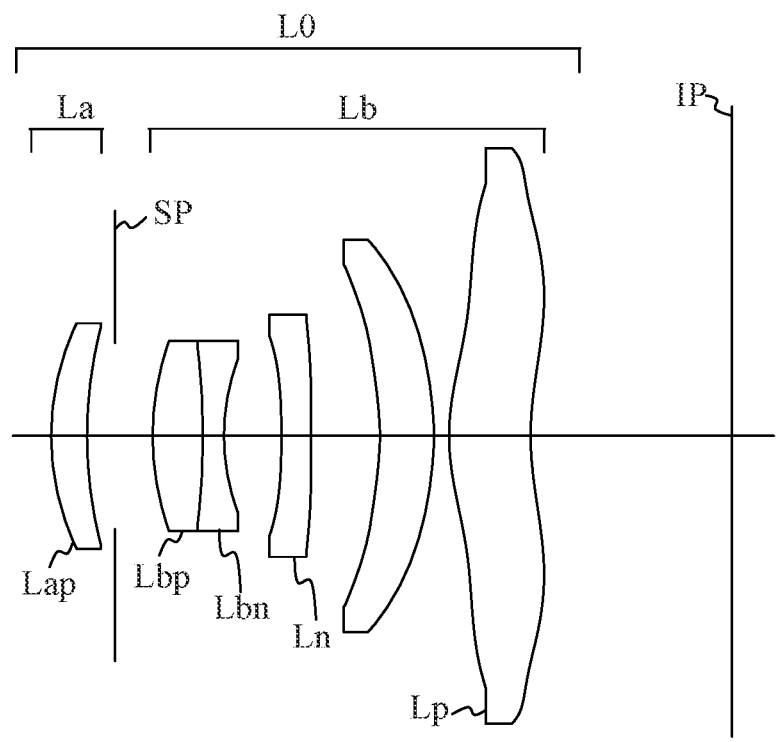
FIG. 1 is a sectional view of an optical system according to Example 1.
Figure 2:
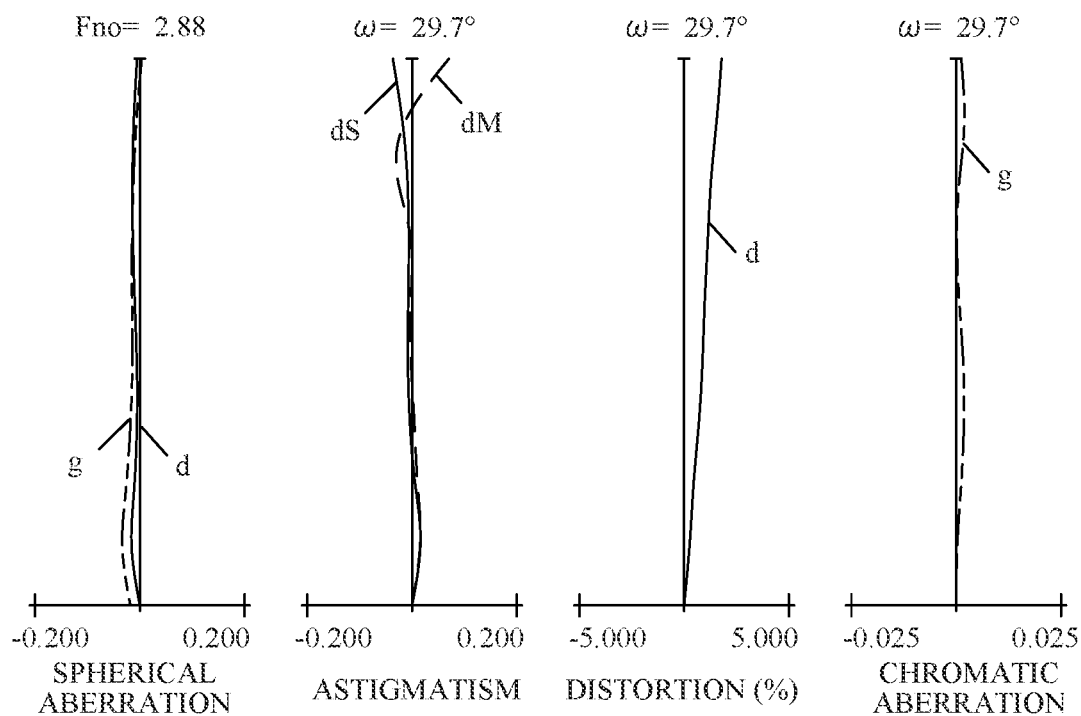
FIG. 2 is an aberration diagram of the optical system according to Example 1 in an in-focus state at infinity.
Figure 3:
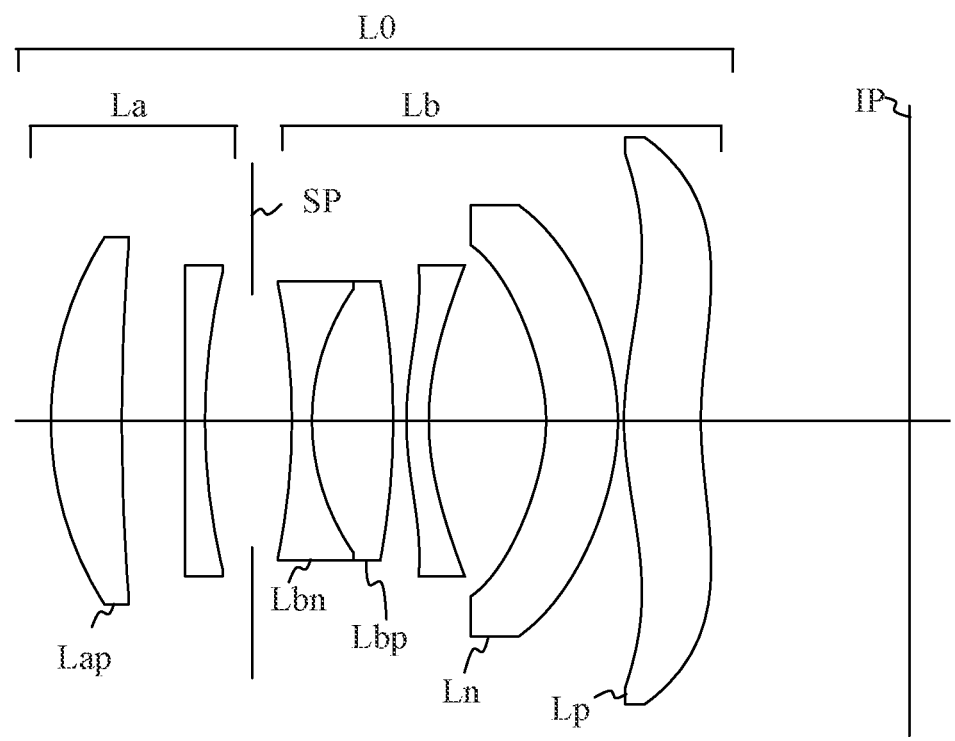
FIG. 3 is a sectional view of an optical system according to Example 2.
Figure 4:
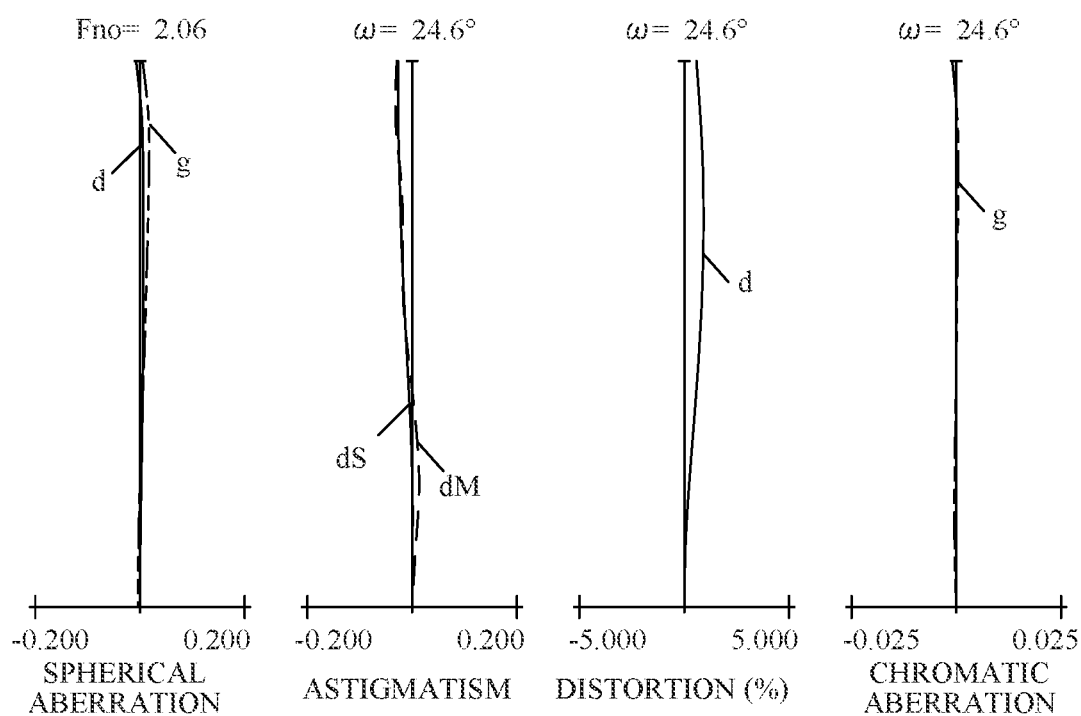
FIG. 4 is an aberration diagram of the optical system according to Example 2 in an in-focus state at infinity.
Figure 5:
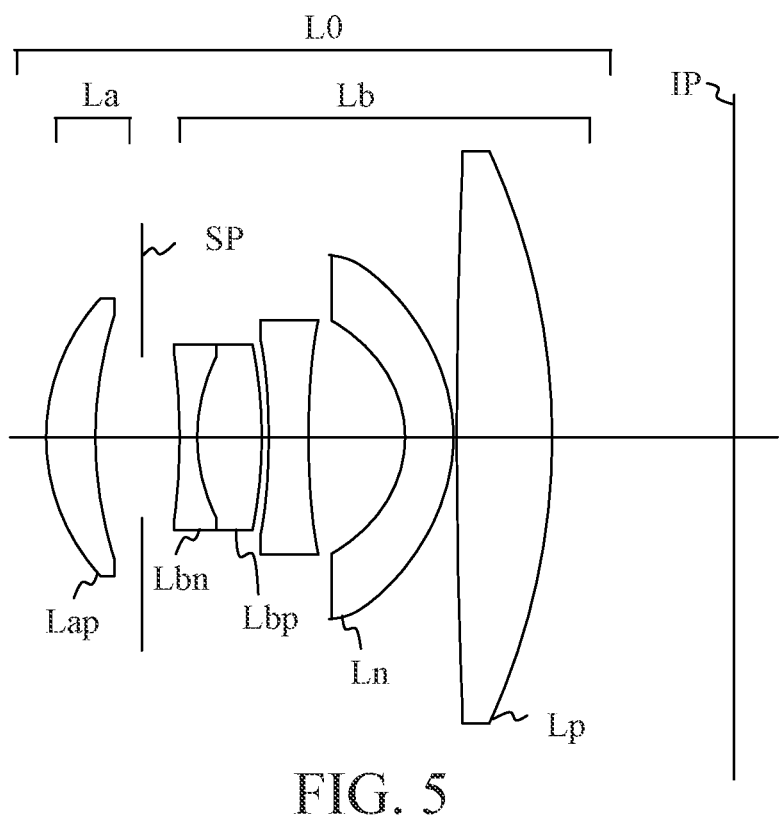
FIG. 5 is a sectional view of an optical system according to Example 3.
Figure 6:
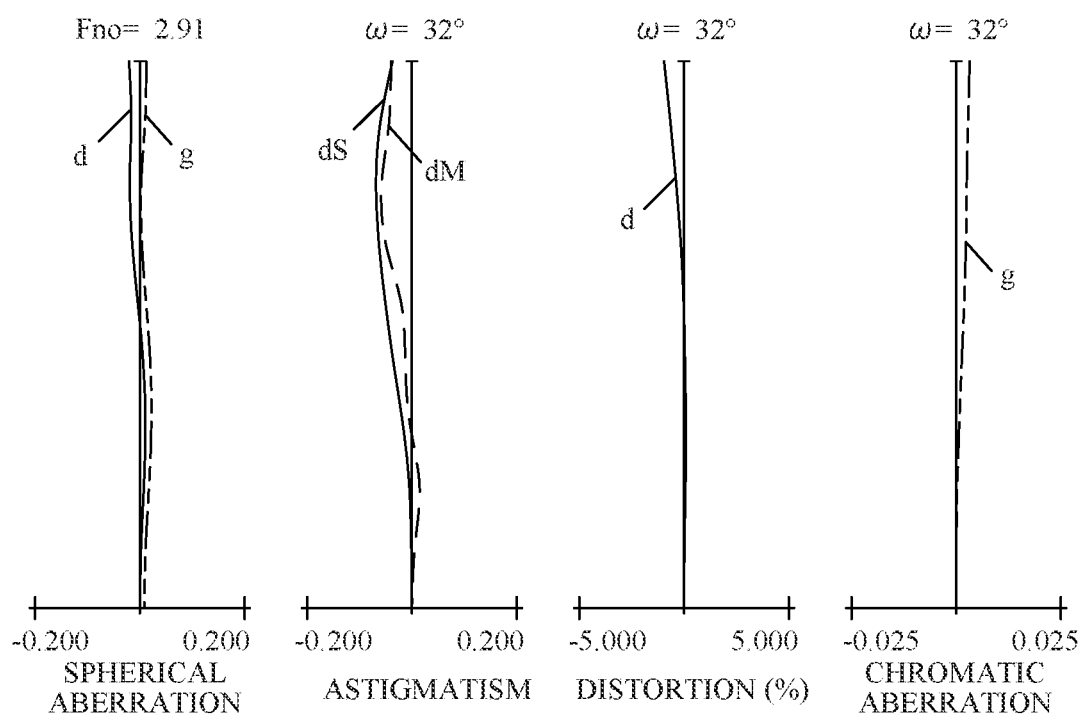
FIG. 6 is an aberration diagram of the optical system according to Example 3 in an in-focus state at infinity.
Figure 7:
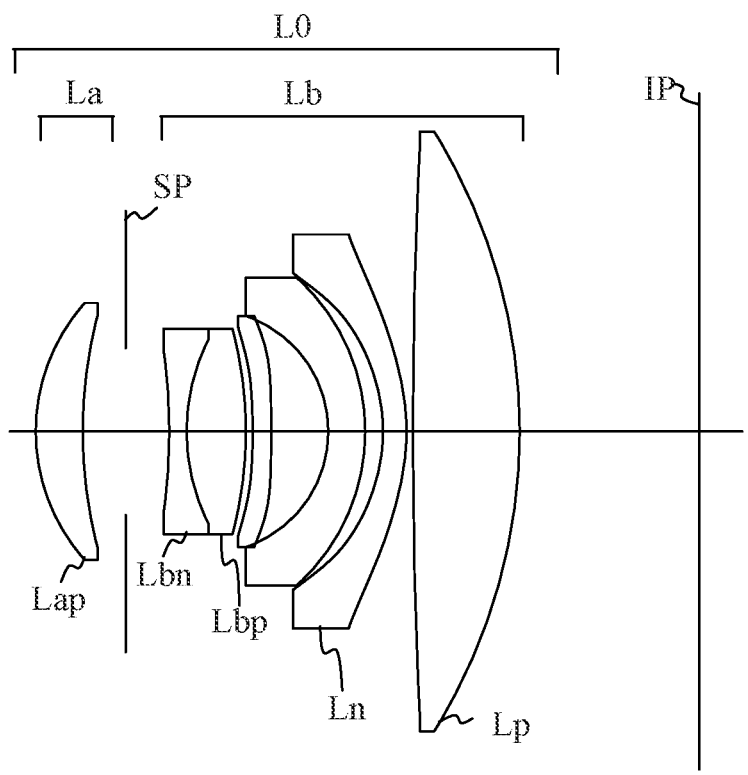
FIG. 7 is a sectional view of an optical system according to Example 4.
Figure 8:
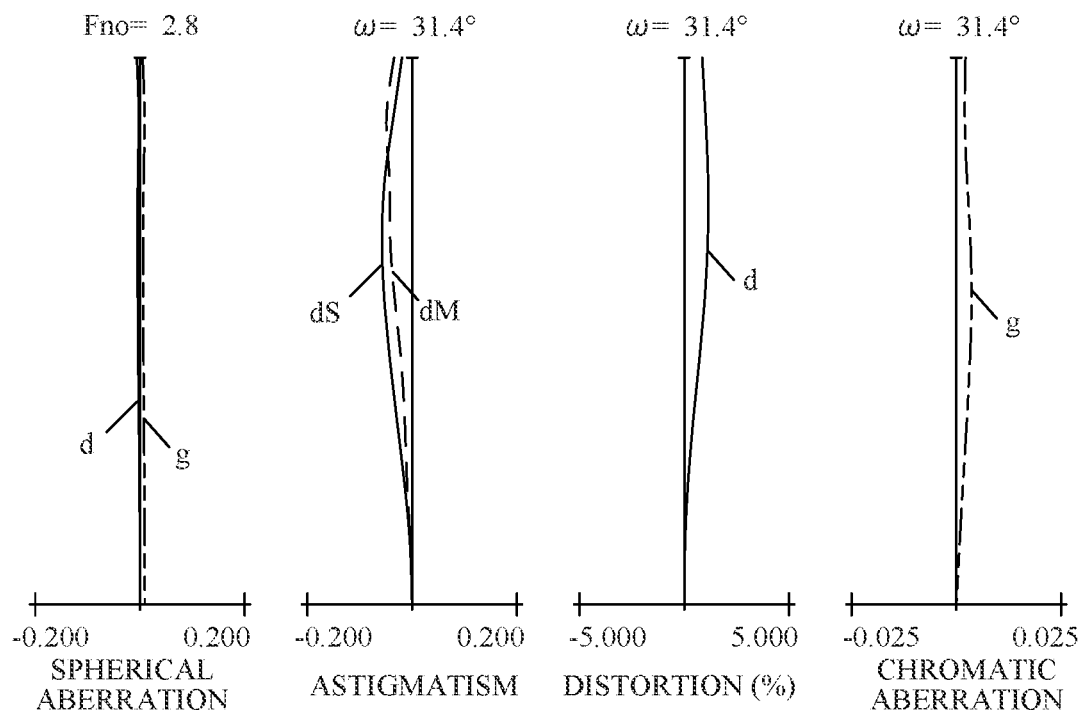
FIG. 8 is an aberration diagram of the optical system according to Example 4 in an in-focus state at infinity.
Figure 9:
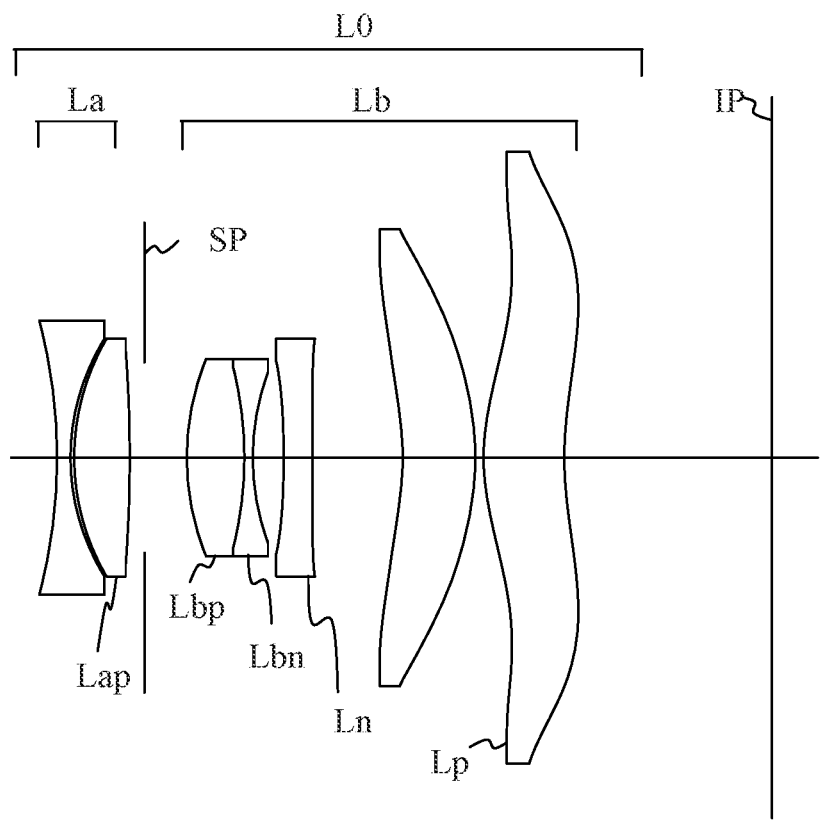
FIG. 9 is a sectional view of an optical system according to Example 5.
Figure 10:
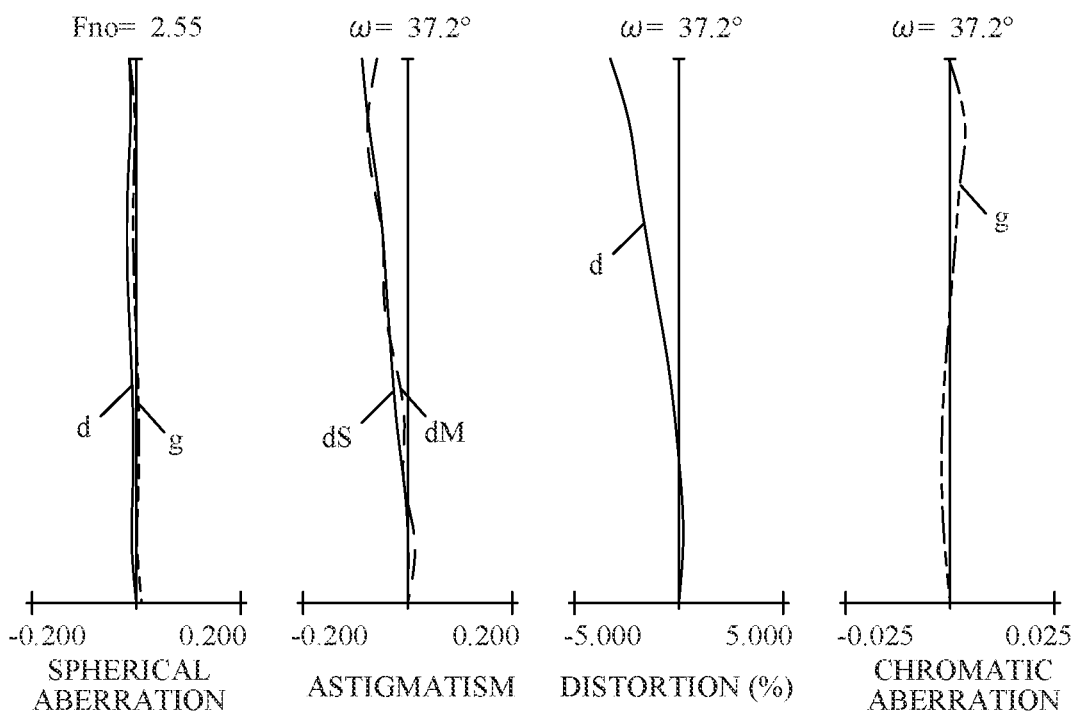
FIG. 10 is an aberration diagram of the optical system according to Example 5 in an in-focus state at infinity.
Figure 11:
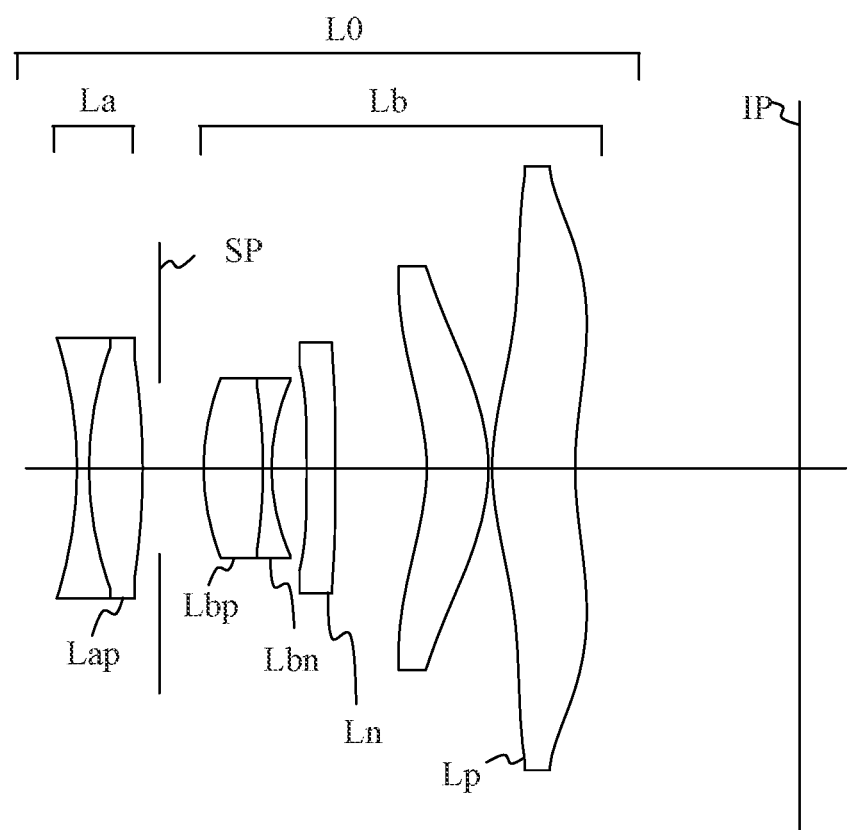
FIG. 11 is a sectional view of an optical system according to Example 6.
Figure 12:
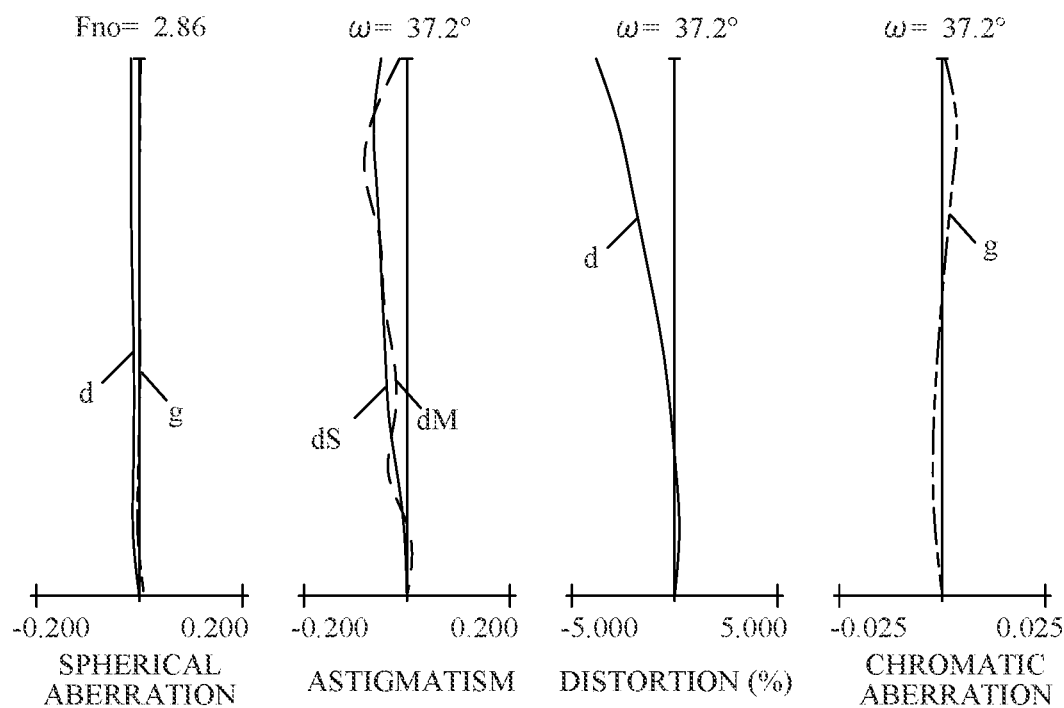
FIG. 12 is an aberration diagram of the optical system according to Example 6 in an in-focus state at infinity.
Figure 13:
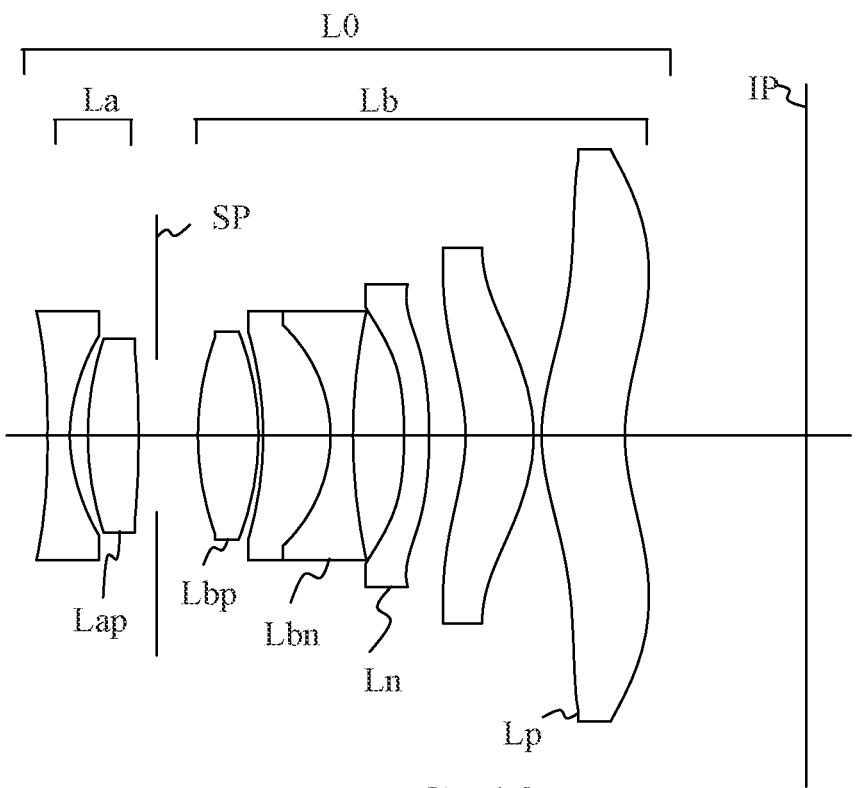
FIG. 13 is a sectional view of an optical system according to Example 7.
Figure 14:
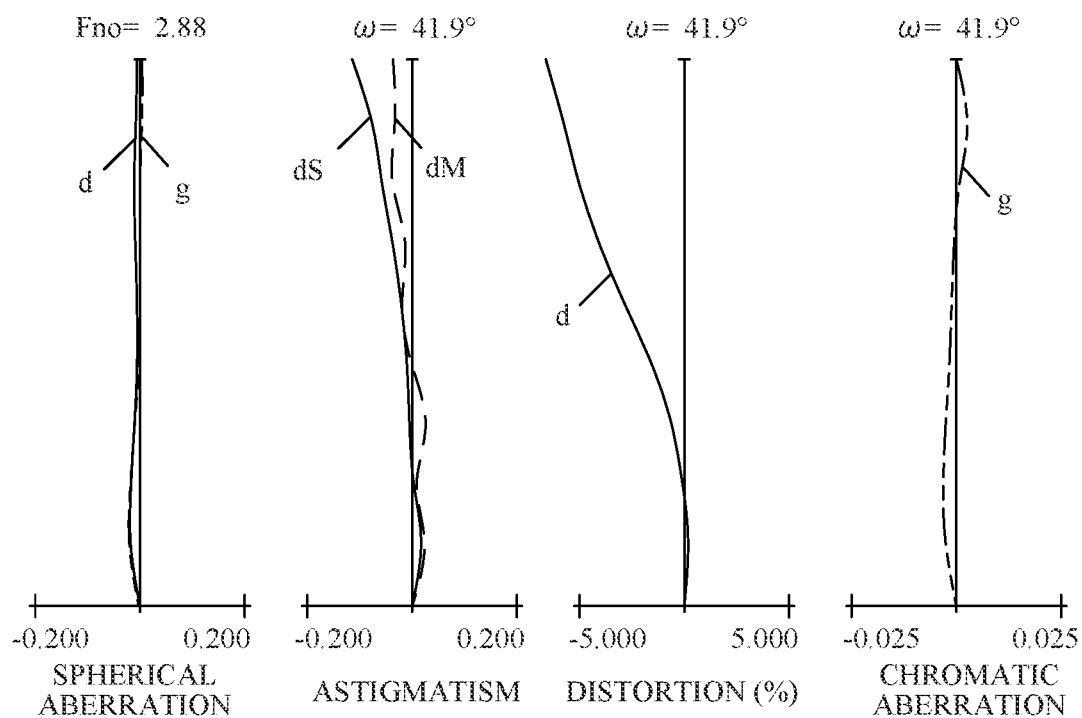
FIG. 14 is an aberration diagram of the optical system according to Example 7 in an in-focus state at infinity.

Referring now to the accompanying drawings, a description will be given of an optical system and an image pickup apparatus having the optical system according to examples of the disclosure.

FIGS. 1, 3, 5, 7, 9, 11, and 13 are sectional views of optical systems L0 according to Examples 1 to 7 in in-focus states at infinity, respectively. The optical system L0 according to each example is an optical system for use with an image pickup apparatus such as a digital video camera, a digital still camera, a broadcasting camera, a film-based camera, and a surveillance camera.

In each lens sectional view, a left side is an object side and a right side is an image (plane) side. The optical system L0 according to each example includes a plurality of lens units.

In each lens sectional view, La denotes a front unit, Lb denotes a rear unit, and Lp denotes a lens (final lens) disposed closest to the image plane and having positive refractive power among lenses included in the rear unit Lb.

SP denotes an aperture stop (diaphragm). IP denotes a (paraxial) image plane, and in a case where the optical system L0 according to each example is used as an imaging optical system for a digital still camera or a digital video camera, a solid-state image sensor (photoelectric conversion element) such as a CCD sensor or a CMOS sensor is used. In a case where the optical system L0 according to each example is used as an imaging optical system for a film-based camera, a photosensitive plane corresponding to the film plane is placed on the image plane IP. In this example, each of the "front unit La" and the "rear unit Lb" may include one or more lenses.

FIGS. 2, 4, 6, 8, 10, 12, and 14 are aberration diagrams of the optical systems L0 according to Examples 1 to 7 in the in-focus states at infinity, respectively.

In the spherical aberration diagram, Fno denotes an F-number, which indicates spherical aberration amounts for the d-line (wavelength 587.56 nm) and g-line (wavelength 435.84 nm). In the astigmatism diagram, dS denotes an astigmatism amount on a sagittal image plane, and dM denotes an astigmatism amount on a meridional image plane. The distortion diagram illustrates a distortion amount for the d-line. The lateral chromatic aberration diagram illustrates a lateral chromatic aberration amount for the g-line. ω is an imaging half angle of view(°).

A description will now be given of a characteristic configuration of the optical system L0 according to each example.

The optical system L0 according to each example is an optical system that consists of, in order from the object side to the image side, a front unit La, an aperture stop SP, and a rear unit Lb that has positive refractive power as a whole. The rear unit Lb includes a final lens Lp disposed closest to the image plane and having positive refractive power.

Generally, in a case where a lens is disposed near the image plane IP, the height of an off-axis light beam incident on the lens increases, and the power to refract the off-axis light beam increases. In the optical system L0 according to each example, the rear unit Lb has positive refractive power. The final lens Lp is a large diameter lens having positive refractive power, disposed closest to the image plane in the rear unit Lb, and configured to properly refract the off-axis light beam, to correct pincushion type distortion, and to suppress the incident angle of the off-axis light beam on the image plane.

The optical system L0 according to each example satisfies the following inequality (1):

$$0.5 < TTL/\Phi i < 1.4 \tag{1}$$

where TTL is a distance (overall lens length) on the optical axis from a lens surface on the object side of a lens disposed closest to the object in the optical system L0 to the image plane IP. That is, it is a length obtained by adding the back focus to the distance on the optical axis from the lens surface closest to the object to the lens surface closest to the image plane in the optical system L0. $\Phi i$ is a diameter of the image circle.

Inequality (1) defines a ratio of the overall lens length to the diameter of the image circle. In a case where the value of TTL/$\Phi i$ is higher than the upper limit of inequality (1), the overall lens length becomes long. In a case where the diameter of the image circle becomes large and the value of TTL/$\Phi i$ is lower than the lower limit of inequality (1), it becomes difficult to correct the curvature of field and distortion at the same time.

In this example, the image circle is defined as a circle having a radius that is a height from the optical axis of a light beam reaching the farthest position from the optical axis among light beams reaching the image plane IP in the in-focus state at infinity. The diameter of the image circle corresponds to twice as long as the image height of the optical system L0. In a case where a ratio of the image plane illuminance of the off-axis light beam to the on-axis light beam is less than 20%, it can be considered that the off-axis light beam has not reached the image plane IP. The diameter $\Phi i$ of the image circle may be expressed by $\Phi i = 2 \times f \times \tan \omega$ where f is a focal length of the optical system L0 and ω is a half angle of view(°).

In a case where the optical system L0 is a zoom lens, TTL is a distance from a lens surface on the object side of a lens closest to the object at the wide-angle end to the image plane IP, and $\Phi i$ is a diameter of the image circle at the wide-angle end.

The optical system L0 according to each example satisfies the following inequality (2):

$$1.64 < PNdave < 2.00 \tag{2}$$

where PNdave is an average value (average refractive index) of refractive indices for the d-line (wavelength 587.56 nm) of all positive lenses included in the optical system L0.

Inequality (2) defines the average refractive index of all positive lenses included in the optical system L0. In a case where the refractive index is higher than the upper limit of inequality (2), chromatic dispersion increases, and it becomes difficult to correct longitudinal chromatic aberration. In a case where the refractive index is lower than the lower limit of inequality (2), the Petzval sum of the entire optical system L0 becomes large and it becomes difficult to correct the curvature of field.

The optical system L0 according to each example satisfies the following inequality (3):

$$2.0 < \Phi p/sk < 4.0 \tag{3}$$

where $\Phi p$ is an effective diameter of a lens surface on the image side of the final lens Lp. sk is an air conversion length (back focus) of the distance on the optical axis from the image-side lens surface of the final lens Lp to the image plane IP.

Inequality (3) defines a ratio between the effective diameter of the image-side lens surface of the final lens Lp and the back focus. In a case where the effective diameter of the final lens Lp increases and the value of $\Phi p/sk$ is higher than the upper limit of inequality (3), the optical system L0 becomes large in the radial direction. In a case where the effective diameter of the final lens Lp reduces and the value of $\Phi p/sk$ is lower than the lower limit of inequality (3), the incident height of the off-axis light beam entering the final lens Lp becomes lower and the refraction effect on the off-axis light beam is reduced. Therefore, it becomes difficult to correct the pincushion type distortion and to suppress the incident angle on the image plane.

In this example, an effective diameter of a lens is a diameter of a circle whose radius is a height from the optical axis of a light ray passing through the lens surface and a position farthest from the optical axis. The effective diameter is defined by a circle inscribed in a mechanical member such as a press ring or a caulking claw on the lens surface. The diameter may be defined by a circle connecting the outermost circumference portions on a surface formed by polishing or molding in a case where no mechanical member is disposed. In a case where the optical system L0 is a zoom lens, sk is the back focus of the zoom lens at the wide-angle end, and $\Phi p$ is the effective diameter of the image-side lens surface of the final lens Lp at the wide-angle end.

Inequality (1) to (3) may be replaced with inequality (1a) to (3a) below:

$$0.9 < TTL/\Phi i < 1.38 \tag{1a}$$

$$1.64 < PNdave < 1.85 \tag{2a}$$

$$2.2 < \Phi p/sk < 3.5 \tag{3a}$$

Inequality (1) to (3) may be replaced with inequality (1b) to (3b) below:

$$0.95 < TTL/\Phi i < 1.37 \quad (1b)$$

$$1.641 < PNdave < 1.792 \quad (2b)$$

$$2.4 < \Phi p/sk < 3.2 \quad (3b)$$

A description will now be given of the conditions and configuration that the optical system L0 according to each example may satisfy. The optical system L0 according to each example may satisfy one or more of inequalities (4) to (14) and the configuration described below.

The optical system L0 according to each example may satisfy the following inequality (4):

$$0.1 < f/|fa| < 1.5 \quad (4)$$

where fa is a focal length of the front unit La, and f is a focal length of the optical system L0.

Inequality (4) defines a ratio between the focal length of the front unit La and the focal length of the optical system L0. In a case where the refractive power of the front unit La increases and the value of f/|fa| is higher than the upper limit of inequality (4), pincushion type distortion increases and it becomes difficult to correct both the curvature of field and the distortion. In a case where the refractive power of the front unit La reduces and the value of f/|fa| is lower than the lower limit of inequality (4), the optical system becomes closer to an optical system that is telecentric on the image side, the position of the exit pupil becomes farther from the image plane IP, and the overall lens length becomes longer. In a case where the optical system L0 is a zoom lens, f is a focal length of the zoom lens at the wide-angle end.

The optical system L0 according to each example may satisfy the following inequality (5):

$$0.6 < fp/f < 6.0 \quad (5)$$

where fp is a focal length of the final lens Lp.

Inequality (5) defines a ratio of the focal length of the final lens Lp and the focal length of the optical system L0. In a case where the refractive power of the final lens Lp becomes weaker and the value of fp/f is higher than the upper limit of inequality (5), it becomes difficult to correct the pincushion type distortion and to suppress the incident angle on the image plane. In a case where the refractive power of the final lens Lp becomes stronger and the value of fp/f is lower than the lower limit of inequality (5), the optical system becomes closer to an optical system that is telecentric on the image side, and the overall lens length becomes longer.

The optical system L0 according to each example may satisfy the following inequality (6):

$$0.1 < sk/f < 0.7 \quad (6)$$

Inequality (6) defines a ratio between the back focus and the focal length of the optical system L0. In a case where the back focus becomes longer and the value of sk/f is higher than the upper limit of inequality (6), the overall lens length becomes longer. In a case where the back focus becomes shorter and the value is lower than the lower limit of inequality (6), the effective diameter of the final lens Lp disposed on the image side becomes larger and the optical system L0 becomes larger in the radial direction.

The optical system L0 according to each example may satisfy the following inequality (7):

$$0.6 < SPIP/TTL < 1.0 \quad (7)$$

where SPIP is a distance on the optical axis from the aperture stop SP to the image plane IP.

Inequality (7) defines a ratio of the position of the aperture stop SP and the overall lens length of the optical system L0. In a case where the position of the aperture stop SP becomes closer to the object and the value of SPIP/TTL is higher than the upper limit of inequality (7), biased vignetting tends to occur, and a blur shape becomes irregular. In a case where the position of the aperture stop SP becomes closer to the image plane and the value of SPIP/TTL is lower than the lower limit of inequality (7), the exit pupil approaches the image plane IP and it becomes difficult to suppress an incident angle of an off-axis light beam on the image plane. In a case where the optical system L0 is a zoom lens, SPIP is a distance from the aperture stop SP of the zoom lens at the wide-angle end to the image plane IP.

In the optical system L0 according to each example, the rear unit Lb may include at least four lenses. Thereby, longitudinal and lateral chromatic aberration can be corrected.

In the optical system L0 according to each example, the rear unit Lb may include a negative lens Ln (first negative lens) disposed on the object side of the final lens Lp in order to correct lateral chromatic aberration and curvature of field.

The optical system L0 according to each example may satisfy the following inequality (8):

$$0.0 < (R1+R2)/(R2-R1) < 50.0 \quad (8)$$

where R1 is a paraxial radius of curvature of a lens surface on the object side of the first negative lens, and R2 is a paraxial radius of curvature of a lens surface on the image side of the first negative lens.

Inequality (8) defines a shape of the negative lens Ln. In a case where the values of R1 and R2 become closer to each other and the value of (R1+R2)/(R2−R1) is higher than the upper limit of inequality (8), the refractive power of the negative lens Ln becomes weaker and it becomes insufficient to correct lateral chromatic aberration. In a case where the value of (R1+R2)/(R2-R1) is lower than the lower limit of inequality (8), the radius of curvature of the image-side lens surface of the negative lens Ln becomes small, it becomes difficult to correct curvature of field and distortion at the same time.

The optical system L0 according to each example may satisfy the following inequality (9):

$$1.500 < Ndn < 4.1945/vdn + 1.520 \quad (9)$$

where Ndn is a refractive index of the negative lens Ln for the d-line, and vdn is an Abbe number of the negative lens Ln based on the d-line.

Inequality (9) defines the refractive index of the negative lens Ln. In a case where the refractive index of the negative lens Ln is higher than the upper limit of inequality (9), the Petzval sum of the entire optical system L0 becomes larger and it becomes difficult to correct the curvature of field. In a case where the refractive index of the negative lens Ln is lower than the lower limit of inequality (9), a material with a large dispersion cannot be selected and it becomes insufficient to correct lateral chromatic aberration.

The optical system L0 according to each example may satisfy the following inequality (10):

$$0.10 < fb/|fa| < 10.00 \quad (10)$$

where fb is a focal length of the rear unit Lb.

Inequality (10) defines a ratio of the focal length of the front unit La to the focal length of the rear unit Lb. In a case where the positive refractive power of the rear unit Lb becomes weak and the value of fb/|fa| becomes higher than the upper limit of inequality (10), it becomes difficult to correct pincushion type distortion and to suppress the incident angle on the image plane. In a case where the value is lower than the lower limit of inequality (10) and the refractive power of the rear unit Lb becomes stronger and the value of fb/|fa| becomes lower than the lower limit of inequality (10), the optical system becomes closer to an optical system that is telecentric on the image side and the overall lens length becomes longer.

In the optical system L0 according to each example, the front unit La may include a positive lens Lap (first positive lens), and the following inequality (11) may be satisfied:

$$1.60 < Ndap < 2.00 \quad (11)$$

where Ndap is a refractive index of the positive lens Lap for the d-line.

Inequality (11) defines the refractive index of the positive lens Lap. In a case where the refractive index of the positive lens Lap is higher than the upper limit of inequality (11), chromatic dispersion becomes large, and it becomes difficult to correct longitudinal chromatic aberration. In a case where the refractive index of the positive lens Lap is lower than the lower limit of inequality (11), the Petzval sum of the entire optical system L0 becomes larger and it becomes difficult to correct curvature of field.

In the optical system L0 according to each example, the rear unit Lb may include a positive lens Lbp (second positive lens), and the following inequality (12) may be satisfied:

$$1.60 < Ndbp < 2.00 \quad (12)$$

where Ndbp is a refractive index of the positive lens Lbp for the d-line.

Inequality (12) defines the refractive index of the positive lens Lbp. In a case where the refractive index of the positive lens Lbp is higher than the upper limit of inequality (12), chromatic dispersion increases and it becomes difficult to correct longitudinal chromatic aberration. In a case where the refractive index of the positive lens Lbp is lower than the lower limit of inequality (12), the Petzval sum of the entire optical system L0 becomes larger and it becomes difficult to correct the curvature of field.

In the optical system L0 according to each example, the rear unit Lb may include a negative lens Lbn (second negative lens), and the following inequality (13) may be satisfied:

$$0.00 < Ndbp - Ndbn < 0.40 \quad (13)$$

where Ndbn is a refractive index of the negative lens Lbn for the d-line.

Inequality (13) defines a refractive index difference between the positive lens Lbp and the negative lens Lbn. In a case where a material having a large refractive index difference is selected and the value of Ndbp-Ndbn is higher than the upper limit of inequality (13), achromatization becomes difficult and it becomes insufficient to correct longitudinal chromatic aberration. A material having a small refractive index difference is selected and the value of Ndbp-Ndbn is lower than the lower limit of inequality (13), the Petzval sum of the entire optical system L0 becomes larger and it becomes difficult to correct the curvature of field.

The optical system L0 according to each example may satisfy the following inequality (14):

$$1.0 < \Phi p / \Phi a < 4.0 \quad (14)$$

where $\Phi a$ is an effective diameter of the lens having the largest effective diameter in the front unit La.

Inequality (14) defines a ratio of the effective diameter of the front unit La to the effective diameter of the final lens Lp disposed closest to the image plane. In a case where the effective diameter of the final lens Lp becomes larger and the value of $\Phi p/\Phi a$ is higher than the upper limit of inequality (14), the optical system L0 becomes larger in the radial direction. In a case where the effective diameter of the final lens Lp becomes smaller and the value of $\Phi p/\Phi a$ is lower than the lower limit of inequality (14), it becomes difficult to correct pincushion type distortion and to suppress the incident angle on the image plane.

The optical system L0 according to each example may include a plurality of lenses. The plurality of lenses may consist of 5 or more and 8 or less lenses in order to achieve both high optical performance and miniaturization.

Inequalities (4) to (14) may be replaced with inequalities (4a) to (14a) below:

$$0.15 < f/|fa| < 1.40 \quad (4a)$$

$$0.7 < fp/f < 5.0 \quad (5a)$$

$$0.2 < sk/f < 0.6 \quad (6a)$$

$$0.70 < SPIP/TTL < 0.95 \quad (7a)$$

$$0.5 < (R1+R2)/(R2-R1) < 25.0 \quad (8a)$$

$$1.510 < Ndn < 4.1945/vdn + 1.500 \quad (9a)$$

$$0.15 < fb/|fa| < 8.50 \quad (10a)$$

$$1.61 < Ndap < 1.95 \quad (11a)$$

$$1.70 < Ndbp < 1.95 \quad (12a)$$

$$0.00 < Ndbp - Ndbn < 0.30 \quad (13a)$$

$$1.2 < \Phi p/\Phi a < 3.0 \quad (14a)$$

Inequalities (4) to (14) may be replaced with inequalities (4b) to (14b) below:

$$0.19 < f/|fa| < 1.30 \quad (4b)$$

$$0.9 < fp/f < 4.2 \quad (5b)$$

$$0.3 < sk/f < 0.5 \quad (6b)$$

$$0.76 < SPIP/TTL < 0.91 \quad (7b)$$

$$1.0 < (R1+R2)/(R2-R1) < 13.0 \quad (8b)$$

$$1.520 < Ndn < 4.1945/vdn + 1.470 \quad (9b)$$

$$0.19 < fb/|fa| < 7.50 \quad (10b)$$

$$1.615 < Ndap < 1.920 \quad (11b)$$

$$1.75 < Ndbp < 1.91 \quad (12b)$$

$$0.015 < Ndbp - Ndbn < 0.262 \quad (13b)$$

$$1.5 < \Phi p/\Phi a < 2.7 \quad (14b)$$

In the optical system L0 according to each example, an optical element such as a cover glass or an IR cut filter may be disposed between the final lens Lp and the image plane IP. Refractive power of a lens represents refractive power near the optical axis (paraxial position).

A detailed description will be given of the optical system L0 according to each example.

The optical system L0 according to Example 1 consists of, in order from the object side to the image side, a front unit La, an aperture stop SP, and a rear unit Lb that has positive refractive power as a whole. The front unit La includes a single positive lens. The rear unit Lb includes, in order from the object side to the image side, a cemented lens of a positive lens and a negative lens, a negative lens, a positive lens, and a positive lens.

The optical system L0 according to Example 2 consists of, in order from the object side to the image side, a front unit La, an aperture stop SP, and a rear unit Lb that has positive refractive power as a whole. The front unit La includes, in order from the object side to the image side, a positive lens and a negative lens. The rear unit Lb includes, in order from the object side to the image side, a cemented lens of a negative lens and a positive lens, a negative lens, a negative lens, and a positive lens.

The optical system L0 according to Example 3 consists of, in order from the object side to the image side, a front unit La, an aperture stop SP, and a rear unit Lb that has positive refractive power as a whole. The front unit La includes a single positive lens. The rear unit Lb includes, in order from the object side to the image side, a cemented lens of a negative lens and a positive lens, a negative lens, a negative lens, and a positive lens.

The optical system L0 according to Example 4 consists of, in order from the object side to the image side, a front unit La, an aperture stop SP, and a rear unit Lb that has positive refractive power as a whole. The front unit La includes a single positive lens. The rear unit Lb includes, in order from the object side to the image side, a cemented lens of a negative lens and a positive lens, a negative lens, a negative lens, a negative lens, and a positive lens.

The optical system L0 according to Example 5 consists of, in order from the object side to the image side, a front unit La, an aperture stop SP, and a rear unit Lb that has positive refractive power as a whole. The front unit La includes, in order from the object side to the image side, a negative lens and a positive lens. The rear unit Lb includes, in order from the object side to the image side, a cemented lens of a positive lens and a negative lens, a negative lens, a positive lens, and a positive lens.

The optical system L0 according to Example 6 consists of, in order from the object side to the image side, a front unit La, an aperture stop SP, and a rear unit Lb that has positive refractive power as a whole. The front unit La includes, in order from the object side to the image side, a cemented lens of a negative lens and a positive lens. The rear unit Lb includes, in order from the object side to the image side, a cemented lens of a positive lens and a negative lens, a negative lens, a positive lens, and a positive lens.

The optical system L0 according to Example 7 consists of, in order from the object side to the image side, a front unit La, an aperture stop SP, and a rear unit Lb that has positive refractive power as a whole. The front unit La includes, in order from the object side to the image side, a negative lens and a positive lens. The rear unit Lb includes, in order from the object side to the image side, a positive lens, a cemented lens of a positive lens and a negative lens, a negative lens, a positive lens, and a positive lens.

Numerical examples 1 to 7 corresponding to examples 1 to 7 will be illustrated below.

In surface data of each numerical example, r represents a radius of curvature of each optical surface, and d (mm) represents an on-axis distance (distance on the optical axis) between an m-th surface and an (m+1)-th surface, where m is the surface number counted from the light incident side. nd represents a refractive index of each optical element for the d-line, and νd represents an Abbe number of the optical member. The Abbe number νd is expressed as follows:

$$\nu d = (Nd-1)/(NF-NC)$$

where Nd, NF, and NC are refractive indices of the optical element based on the d-line (587.6 nm), F-line (486.1 nm), and C-line (656.3 nm) in the Fraunhofer line, respectively.

In each numerical example, each of d, focal length (mm), F-number, and half angle of view (degrees) has a value in a case where the optical system L0 according to each example is in focus on an object at infinity (infinity object). A "back focus (BF)" is a distance on the optical axis from the final lens surface (lens surface closest to the image plane) to a paraxial image plane in terms of air equivalent length. An "overall lens length" is a length obtained by adding the back focus to a distance on the optical axis from the frontmost surface (lens surface closest to the object) to the final surface of the optical system L0.

In a case where the optical surface is aspherical, an asterisk * is attached to the right side of the surface number. The aspherical shape is expressed as follows:

$$X = \frac{(1/R)H^2}{1+\sqrt{1-(1+K)(H/R)^2}} + A3 \times |H|^3 + A4 \times |H|^4 +$$
$$A5 \times |H|^5 + A6 \times |H|^6 + A7 \times |H|^7 + A8 \times |H|^8 + A9 \times |H|^9 +$$
$$A10 \times |H|^{10} + A11 \times |H|^{11} + A12 \times |H|^{12} + A13 \times |H|^{13} + A14 \times |H|^{14}$$

where X is a displacement amount from a surface vertex in the optical axis direction, H is a height from the optical axis in a direction orthogonal to the optical axis, R is a paraxial radius of curvature, K is a conical constant, A3 to A15 are aspherical coefficients of respective orders. "e±XX" means "$\times 10^{\pm XX}$."

Numerical Example 1

| UNIT: mm | | | | | |
|---|---|---|---|---|---|
| Surface Data | | | | | |
| Surface Number | r | d | nd | νd | Effective Diameter |
| 1 | 6.260 | 0.86 | 1.72916 | 54.7 | 4.80 |
| 2 | 10.445 | 0.67 | | | 4.58 |
| 3 (stop) | ∞ | 0.90 | | | 4.47 |
| 4 | 6.769 | 1.21 | 1.90043 | 37.4 | 4.14 |
| 5 | −17.277 | 0.50 | 1.74077 | 27.8 | 3.80 |
| 6 | 5.222 | 1.38 | | | 3.35 |
| 7* | −17.501 | 0.71 | 1.63560 | 23.9 | 4.36 |
| 8* | −102.984 | 1.65 | | | 5.27 |
| 9* | −6.645 | 1.30 | 1.63560 | 23.9 | 7.43 |
| 10* | −6.698 | 0.36 | | | 8.53 |
| 11* | 5.559 | 1.95 | 1.53500 | 56.0 | 12.13 |
| 12* | 7.159 | (variable) | | | 12.62 |
| Image Plane | ∞ | | | | |

| Aspheric Data |
|---|

7th Surface

K = 0.00000e+00 A4 = −1.07563e−02 A6 = −1.05029e−02
A8 = −6.35129e−04 A3 = 4.83637e−03 A5 = 1.12736e−02
A7 = 4.29894e−03

-continued

UNIT: mm

8th Surface

K = 0.00000e+00 A4 = 7.30840e−03 A6 = −4.56636e−04
A8 = −9.60399e−05 A3 = −2.56213e−03 A5 = −4.86845e−03
A7 = 7.05515e−04
9th Surface K = 1.46022e+00 A4 = 3.50415e−02 A6 = 2.52119e−04
A8 = −1.67257e−04 A10 = 2.35759e−06 A3 = −1.55185e−02
A5 = −1.27191e−02 A7 = 8.24290e−04
10th Surface K = −1.25577e+00 A4 = 1.62098e−02 A6 = 1.87296e−03
A8 = 5.42303e−06 A10 = −2.12988e−08 A3 = −3.98973e−03
A5 = −8.68766e−03 A7 = −1.76229e−04
11th Surface K = −1.44696e+01 A4 = 7.50341e−03 A6 = 1.22100e−03
A8 = −8.39694e−05 A10 = −4.58570e−07 A3 = 3.44333e−03
A5 = −6.75667e−03 A7 = 1.70998e−04 A9 = 1.04779e−05
12th Surface K = −1.20114e+01 A4 = −8.25372e−03 A6 = −4.77190e−03
A8 = −2.89053e−04 A10 = −1.08364e−06 A3 = 2.30350e−03
A5 = 7.76429e−03 A7 = 1.58451e−03 A9 = 2.76387e−05

Various Data

| | |
|---|---|
| Focal Length: | 13.82 |
| F-Number: | 2.88 |
| Half Angle of View (°): | 29.72 |
| Image Height: | 7.89 |
| Overall Lens Length: | 16.32 |
| Back Focus: | 4.83 |
| d12: | 4.83 |

Single Lens Data

| Lens | Starting Surface | Focal Length |
|---|---|---|
| 1 | 1 | 19.72 |
| 2 | 4 | 5.53 |
| 3 | 5 | −5.36 |
| 4 | 7 | −33.28 |
| 5 | 9 | 154.89 |
| 6 | 11 | 32.60 |

Numerical Example 2

UNIT: mm

Surface Data

| Surface Number | r | d | nd | vd | Effective Diameter |
|---|---|---|---|---|---|
| 1 | 8.535 | 1.78 | 1.72916 | 54.7 | 8.35 |
| 2 | 54.576 | 1.59 | | | 7.97 |
| 3 | 1116.973 | 0.50 | 1.76182 | 26.5 | 6.96 |
| 4 | 15.804 | 1.18 | | | 6.63 |
| 5 (Stop) | ∞ | 1.00 | | | 6.34 |
| 6 | −16.891 | 0.50 | 1.63980 | 34.5 | 6.09 |
| 7 | 5.764 | 2.04 | 1.90043 | 37.4 | 5.98 |
| 8 | −19.006 | 0.33 | | | 6.27 |
| 9* | 9.018 | 0.55 | 1.61550 | 25.8 | 6.74 |
| 10* | 6.674 | 2.94 | | | 7.04 |
| 11* | −4.712 | 1.80 | 1.67070 | 19.3 | 7.95 |
| 12* | −6.144 | 0.16 | | | 9.79 |
| 13* | 8.031 | 1.93 | 1.53110 | 56.0 | 12.23 |
| 14* | 10.796 | (variable) | | | 13.08 |
| Image Plane | ∞ | | | | |

-continued

UNIT: mm

Aspheric Data

9th Surface

K = 0.00000e+00 A4 = −1.84389e−03 A6 = −1.16302e−04
A8 = 4.41572e−06 A10 = 1.25231e−07 A12 = −7.95831e−09
10th Surface K = 0.00000e+00 A4 = −1.02522e−03 A6 = −1.31968e−04
A8 = 8.52375e−06 A10 = −9.50218e−08 A12 = −2.02084e−09
11th Surface K = 0.00000e+00 A4 = 5.16315e−03 A6 = −3.54315e−04
A8 = 2.68121e−05 A10 = −1.19044e−06 A12 = 2.36728e−08
12th Surface K = 0.00000e+00 A4 = 1.70854e−03 A6 = −8.20838e−05
A8 = 4.87853e−06 A10 = −1.77527e−07 A12 = 2.49283e−09
13th Surface K = −9.97557e+00 A4 = −1.35719e−03 A6 = 1.42774e−05
A8 = 8.19110e−07 A10 = −4.84714e−08 A12 = 9.59127e−10
A14 = −6.48919e−12
14th Surface K = −2.08501e+01 A4 = −9.41503e−04 A6 = −1.72682e−05
A8 = 1.41035e−06 A10 = −4.48295e−08 A12 = 6.50318e−10
A14 = −3.78611e−12

Various Data

| | |
|---|---|
| Focal Length: | 17.20 |
| F-Number: | 2.06 |
| Half Angle of View (°): | 24.65 |
| Image Height: | 7.89 |
| Overall Lens Length: | 21.52 |
| Back Focus: | 5.22 |
| d14: | 5.22 |

Single Lens Data

| Lens | Starting Surface | Focal Length |
|---|---|---|
| 1 | 1 | 13.65 |
| 2 | 3 | −21.05 |
| 3 | 6 | −6.66 |
| 4 | 7 | 5.11 |
| 5 | 9 | −45.81 |
| 6 | 11 | −60.86 |
| 7 | 13 | 47.55 |

Numerical Example 3

UNIT: mm

Surface Data

| Surface Number | r | d | nd | vd | Effective Diameter |
|---|---|---|---|---|---|
| 1 | 4.707 | 1.13 | 1.61800 | 63.4 | 5.68 |
| 2 | 9.145 | 1.07 | | | 4.97 |
| 3 (Stop) | ∞ | 0.88 | | | 3.73 |
| 4 | −13.939 | 0.40 | 1.60342 | 38.0 | 3.47 |
| 5 | 4.094 | 1.49 | 1.85150 | 40.8 | 3.37 |
| 6 | −10.702 | 0.16 | | | 3.89 |
| 7* | −20.317 | 0.92 | 1.63560 | 23.9 | 4.05 |
| 8* | 16.176 | 2.24 | | | 4.80 |
| 9* | −2.684 | 1.11 | 1.67070 | 19.3 | 5.38 |
| 10* | −4.213 | 0.07 | | | 7.49 |
| 11 | 144.002 | 2.21 | 1.90366 | 31.3 | 11.56 |
| 12 | −15.708 | (variable) | | | 12.19 |
| Image Plane | ∞ | | | | |

-continued

UNIT: mm

Aspheric Data

7th Surface

K = 0.00000e+00 A4 = −4.18307e−03 A6 = 1.49689e−03
A8 = −8.47348e−04 A10 = 2.67501e−04 A12 = −3.97751e−05
A14 = 2.16051e−06

8th Surface

K = 0.00000e+00 A4 = −2.16772e−03 A6 = 5.73321e−04
A8 = −1.35772e−04 A10 = 2.41817e−05 A12 = −1.37987e−06
A14 = −9.50059e−09

9th Surface

K = −4.70448e+00 A4 = −2.76003e−02 A6 = 5.61591e−03
A8 = −1.38408e−03 A10 = 2.30576e−04 A12 = −2.32076e−05
A14 = 9.79590e−07

10th Surface

K = 0.00000e+00 A4 = 1.27980e−03 A6 = 5.55638e−05
A8 = −5.37022e−06 A10 = 9.26509e−07 A12 = −6.95746e−08
A14 = 2.53834e−09

Various Data

| | |
|---|---|
| Focal Length: | 12.64 |
| F-Number: | 2.91 |
| Half Angle of View (°): | 31.97 |
| Image Height: | 7.89 |
| Overall Lens Length: | 15.87 |
| Back Focus: | 4.19 |
| d12: | 4.19 |

Single Lens Data

| Lens | Starting Surface | Focal Length |
|---|---|---|
| 1 | 1 | 14.30 |
| 2 | 4 | −5.20 |
| 3 | 5 | 3.65 |
| 4 | 7 | −14.03 |
| 5 | 9 | −15.58 |
| 6 | 11 | 15.78 |

Numerical Example 4

UNIT: mm

Surface Data

| Surface Number | r | d | nd | vd | Effective Diameter |
|---|---|---|---|---|---|
| 1 | 4.508 | 1.10 | 1.69680 | 55.5 | 5.41 |
| 2 | 10.717 | 1.00 | | | 4.80 |
| 3 (Stop) | ∞ | 1.02 | | | 3.90 |
| 4 | −13.463 | 0.40 | 1.69895 | 30.1 | 3.43 |
| 5 | 4.776 | 1.39 | 1.83481 | 42.7 | 3.91 |
| 6 | −9.237 | 0.16 | | | 4.36 |
| 7* | −16.299 | 0.43 | 1.53110 | 55.9 | 4.46 |
| 8* | −187.887 | 1.34 | | | 4.77 |
| 9 | −2.854 | 0.86 | 1.92286 | 20.9 | 4.91 |
| 10 | −4.834 | 0.42 | | | 6.52 |
| 11* | −4.029 | 0.55 | 1.53110 | 55.9 | 6.64 |
| 12* | −5.433 | 0.15 | | | 8.35 |
| 13 | 132.002 | 2.50 | 2.00100 | 29.1 | 12.25 |
| 14 | −13.257 | (variable) | | | 12.81 |
| Image Plane | ∞ | | | | |

-continued

UNIT: mm

Aspheric Data

7th Surface

K = 0.00000e+00 A4 = −8.03294e−03 A6 = 6.42603e−04
A8 = −1.71864e−05 A10 = −2.18210e−05 A12 = 5.95829e−06
A14 = −3.26994e−07

8th Surface

K = 0.00000e+00 A4 = −9.37478e−03 A6 = 5.54245e−04
A8 = −6.69460e−05 A10 = −6.99311e−06 A12 = 1.91513e−06
A14 = −4.31530e−08

11th Surface

K = 0.00000e+00 A4 = 2.04929e−03 A6 = 2.43258e−04
A8 = −7.52984e−05 A10 = 7.10962e−06 A12 = −4.53349e−07
A14 = 1.70146e−08

12th Surface

K = 0.00000e+00 A4 = 2.56257e−03 A6 = 2.07946e−04
A8 = −4.35551e−05 A10 = 3.28693e−06 A12 = −1.10371e−07
A14 = 1.45867e−09

Various Data

| | |
|---|---|
| Focal Length: | 12.94 |
| F-Number: | 2.80 |
| Half Angle of View (°): | 31.36 |
| Image Height: | 7.89 |
| Overall Lens Length: | 15.50 |
| Back Focus: | 4.19 |
| d14: | 4.19 |

Single Lens Data

| Lens | Starting Surface | Focal Length |
|---|---|---|
| 1 | 1 | 10.41 |
| 2 | 4 | −5.00 |
| 3 | 5 | 3.95 |
| 4 | 7 | −33.63 |
| 5 | 9 | −9.55 |
| 6 | 11 | −33.93 |
| 7 | 13 | 12.14 |

Numerical Example 5

UNIT: mm

Surface Data

| Surface Number | r | d | nd | vd | Effective Diameter |
|---|---|---|---|---|---|
| 1 | −11.704 | 0.29 | 1.59270 | 35.3 | 5.34 |
| 2 | 4.905 | 0.08 | | | 4.65 |
| 3 | 5.130 | 1.22 | 1.91082 | 35.2 | 4.63 |
| 4 | −29.778 | 0.32 | | | 4.26 |
| 5 (Stop) | ∞ | 0.92 | | | 4.17 |
| 6 | 5.703 | 1.26 | 1.87070 | 40.7 | 3.92 |
| 7 | −8.099 | 0.18 | 1.76182 | 26.5 | 3.61 |
| 8 | 5.381 | 0.68 | | | 3.38 |
| 9* | −21.874 | 0.63 | 1.53500 | 56.0 | 3.81 |
| 10* | −135.199 | 1.97 | | | 4.63 |
| 11* | −5.817 | 1.59 | 1.53500 | 56.0 | 8.06 |
| 12* | −5.050 | 0.18 | | | 8.94 |
| 13* | 6.415 | 1.77 | 1.53500 | 56.0 | 11.65 |
| 14* | 8.812 | (variable) | | | 12.22 |
| Image Plane | ∞ | | | | |

-continued

UNIT: mm

Aspheric Data

9th Surface

K = 0.00000e+00 A4 = −2.23331e−02 A6 = −1.37107e−02
A8 = −4.99539e−04 A3 = 1.02926e−02 A5 = 2.10970e−02
A7 = 4.33469e−03
10th Surface K = 0.00000e+00 A4 = −1.34981e−02 A6 = −8.17785e−03
A8 = −2.49052e−04 A3 = 1.01369e−02 A5 = 1.34718e−02
A7 = 2.44157e−03
11th Surface K = −3.44235e+01 A4 = −1.31612e−02 A6 = −6.61143e−03
A8 = −1.37858e−04 A10 = 6.72689e−07 A3 = 3.65090e−04
A5 = 1.47395e−02 A7 = 1.44729e−03
12th Surface K = −3.08794e+00 A4 = −4.69366e−02 A6 = −9.52789e−03
A8 = −1.71551e−04 A10 = 7.65261e−07 A3 = 4.54234e−02
A5 = 2.71741e−02 A7 = 1.88545e−03
13th Surface K = −4.72297e+01 A4 = −3.62984e−02 A6 = −3.40402e−03
A8 = −8.43606e−05 A10 = −2.63594e−07 A3 = 5.57242e−02
A5 = 1.28857e−02 A7 = 6.48527e−04 A9 = 6.89276e−06
14th Surface K = −1.98741e+01 A4 = −2.10859e−02 A6 = −5.43361e−03
A8 = −2.11629e−04 A10 = −6.17168e−07 A3 = 1.69037e−02
A5 = 1.31038e−02 A7 = 1.38770e−03 A9 = 1.76760e−05

Various Data

| | |
|---|---|
| Focal Length: | 10.39 |
| F-Number: | 2.55 |
| Half Angle of View (°): | 37.20 |
| Image Height: | 7.89 |
| Overall Lens Length: | 15.65 |
| Back Focus: | 4.54 |
| d14: | 4.54 |

Single Lens Data

| Lens | Starting Surface | Focal Length |
|---|---|---|
| 1 | 1 | −5.79 |
| 2 | 3 | 4.89 |
| 3 | 6 | 4.01 |
| 4 | 7 | −4.22 |
| 5 | 9 | −48.87 |
| 6 | 11 | 41.54 |
| 7 | 13 | 35.08 |

Numerical Example 6

UNIT: mm

Surface Data

| Surface Number | r | d | nd | vd | Effective Diameter |
|---|---|---|---|---|---|
| 1 | −9.182 | 0.26 | 1.59270 | 35.3 | 5.05 |
| 2 | 7.573 | 1.16 | 1.91082 | 35.2 | 4.55 |
| 3 | −15.973 | 0.36 | | | 4.19 |
| 4 (Stop) | ∞ | 0.95 | | | 3.70 |
| 5 | 5.201 | 1.28 | 1.87070 | 40.7 | 3.52 |
| 6 | −11.975 | 0.18 | 1.76182 | 26.5 | 3.23 |
| 7 | 4.561 | 0.76 | | | 3.42 |
| 8* | −85.757 | 0.61 | 1.53500 | 56.0 | 3.99 |
| 9* | −3646.869 | 1.98 | | | 4.79 |
| 10* | −4.133 | 1.32 | 1.53500 | 56.0 | 8.03 |
| 11* | −3.726 | 0.08 | | | 8.68 |
| 12* | 6.434 | 1.79 | 1.53500 | 56.0 | 11.47 |
| 13* | 8.046 | (variable) | | | 11.95 |
| Image Plane | ∞ | | | | |

Aspheric Data

8th Surface

K = 0.00000e+00 A4 = −2.15591e−02 A6 = −1.45344e−02
A8 = −6.45412e−04 A3 = 7.31285e−03 A5 = 2.05408e−02
A7 = 4.98873e−03
9th Surface K = 0.00000e+00 A4 = −1.38627e−02 A6 = −7.94143e−03
A8 = −2.15749e−04 A3 = 6.84598e−03 A5 = 1.26489e−02
A7 = 2.30518e−03
10th Surface K = −1.83110e+01 A4 = −1.28739e−02 A6 = −6.60464e−03
A8 = −1.38472e−04 A10 = 5.89377e−07 A3 = −4.50600e−03
A5 = 1.51074e−02 A7 = 1.45049e−03
11th Surface K = −4.49148e+00 A4 = −4.78510e−02 A6 = −9.42635e−03
A8 = −1.74438e−04 A10 = 6.95369e−07 A3 = 3.87383e−02
A5 = 2.75181e−02 A7 = 1.89210e−03
12th Surface K = −5.38183e+01 A4 = −3.59530e−02 A6 = −3.36121e−03
A8 = −8.55245e−05 A10 = −2.45687e−07 A3 = 5.16366e−02
A5 = 1.29027e−02 A7 = 6.49569e−04 A9 = 6.80215e−06
13th Surface K = −2.25124e+01 A4 = −2.20658e−02 A6 = −5.43967e−03
A8 = −2.11458e−04 A10 = −6.20841e−07 A3 = 1.55469e−02
A5 = 1.34176e−02 A7 = 1.38383e−03 A9 = 1.77223e−05

Various Data

| | |
|---|---|
| Focal Length: | 10.39 |
| F-Number: | 2.86 |
| Half Angle of View (°): | 37.20 |
| Image Height: | 7.89 |
| Overall Lens Length: | 15.55 |
| Back Focus: | 4.83 |
| d13: | 4.83 |

Single Lens Data

| Lens | Starting Surface | Focal Length |
|---|---|---|
| 1 | 1 | −6.96 |
| 2 | 2 | 5.78 |
| 3 | 5 | 4.31 |
| 4 | 6 | −4.31 |
| 5 | 8 | −164.16 |
| 6 | 10 | 33.15 |
| 7 | 12 | 43.30 |

Numerical Example 7

UNIT: mm

Surface Data

| Surface Number | r | d | nd | vd | Effective Diameter |
|---|---|---|---|---|---|
| 1* | −3586.364 | 0.50 | 1.58313 | 59.4 | 4.98 |
| 2* | 3.305 | 0.40 | | | 4.07 |
| 3 | 6.805 | 1.15 | 1.72916 | 54.7 | 3.97 |

-continued

UNIT: mm

| | | | | | |
|---|---|---|---|---|---|
| 4 | −20.438 | 0.41 | | | 3.51 |
| 5 (Stop) | ∞ | 0.92 | | | 3.45 |
| 6 | 6.513 | 1.36 | 1.75500 | 52.3 | 4.01 |
| 7 | −6.331 | 0.11 | | | 4.25 |
| 8 | −8.195 | 1.51 | 1.65844 | 50.9 | 4.27 |
| 9 | −3.404 | 0.50 | 1.73800 | 32.3 | 4.52 |
| 10 | 13.112 | 1.15 | | | 5.05 |
| 11* | −10.477 | 0.56 | 1.53500 | 56.0 | 5.24 |
| 12* | −12.314 | 0.82 | | | 6.05 |
| 13* | −4.165 | 1.53 | 1.53500 | 56.0 | 7.58 |
| 14* | −4.049 | 0.18 | | | 8.44 |
| 15* | 4.151 | 1.87 | 1.53500 | 56.0 | 12.30 |
| 16* | 4.590 | (variable) | | | 12.86 |
| Image Plane | ∞ | | | | |

Aspheric Data

1st Surface

K = 0.00000e+00 A4 = −1.58804e−02 A6 = 2.24199e−03
A8 = 1.83096e−04 A3 = −3.16093e−03 A5 = 4.71244e−03
A7 = −1.32163e−03

2nd Surface

K = 4.72161e−01 A4 = −1.76482e−02 A6 = 1.39866e−03
A8 = −9.37739e−05 A3 = −5.29217e−03 A5 = 3.59190e−03
A7 = −4.59994e−04

11th Surface

K = 0.00000e+00 A4 = −1.05979e−02 A6 = −2.78920e−04
A8 = 1.32419e−04 A10 = −5.02271e−06

12th Surface

K = 0.00000e+00 A4 = −5.08433e−03 A6 = −3.11798e−04
A8 = 1.12668e−04 A10 = −4.13907e−06

13th Surface

K = −1.22936e+01 A4 = 9.88450e−03 A6 = 2.44515e−03
A8 = 8.11852e−05 A10 = −7.20367e−07 A3 = −8.89814e−03
A5 = −5.23719e−03 A7 = −6.59829e−04

14th Surface

K = −1.34110e+00 A4 = −1.16917e−04 A6 = −1.54999e−03
A8 = −3.18547e−05 A10 = −6.97583e−08 A3 = −3.16936e−03
A5 = 3.22415e−03 A7 = 3.73888e−04

15th Surface

K = −1.12242e+00 A4 = −2.35753e−02 A6 = −4.14295e−03
A8 = −1.53627e−04 A10 = −4.33086e−07 A3 = 4.45348e−03
A5 = 1.17935e−02 A7 = 1.01655e−03 A9 = 1.26550e−05

16th Surface

K = −6.08828e−01 A4 = −1.82200e−02 A6 = −1.43596e−03
A8 = −3.10115e−05 A10 = −5.37345e−08 A3 = 5.03772e−03
A5 = 6.01578e−03 A7 = 2.59656e−04 A9 = 2.01631e−06

Various Data

| | |
|---|---|
| Focal Length: | 8.79 |
| F-Number: | 2.88 |
| Half Angle of View (°): | 41.92 |
| Image Height: | 7.89 |
| Overall Lens Length: | 17.05 |
| Back Focus: | 4.07 |
| d16: | 4.07 |

Single Lens Data

| Lens | Starting Surface | Focal Length |
|---|---|---|
| 1 | 1 | −5.66 |
| 2 | 3 | 7.13 |
| 3 | 6 | 4.46 |
| 4 | 8 | 7.86 |
| 5 | 9 | −3.62 |
| 6 | 11 | −147.00 |

-continued

UNIT: mm

| | | |
|---|---|---|
| 7 | 13 | 48.53 |
| 8 | 15 | 32.60 |

Table 1 below summarizes various values in each numerical example. "Ex." represents Example, and each parenthesis represents a corresponding inequality.

TABLE 1

| | Ex. 1 | Ex. 2 | Ex. 3 | Ex. 4 | Ex. 5 | Ex. 6 | Ex. 7 |
|---|---|---|---|---|---|---|---|
| (1) | 1.034 | 1.364 | 1.006 | 0.982 | 0.991 | 0.985 | 1.081 |
| (2) | 1.700 | 1.748 | 1.791 | 1.844 | 1.713 | 1.677 | 1.643 |
| (3) | 2.615 | 2.503 | 2.909 | 3.054 | 2.690 | 2.475 | 3.160 |
| (4) | 0.701 | 0.626 | 0.884 | 1.243 | 0.418 | 0.377 | 0.194 |
| (5) | 2.359 | 2.765 | 1.248 | 0.938 | 3.375 | 4.166 | 3.711 |
| (6) | 0.349 | 0.304 | 0.332 | 0.324 | 0.437 | 0.465 | 0.463 |
| (7) | 0.906 | 0.766 | 0.861 | 0.864 | 0.878 | 0.886 | 0.856 |
| (8) | 1.409 | 7.583 | 4.512 | 6.738 | 1.386 | 1.048 | 12.408 |
| (9) | 1.636 | 1.671 | 1.671 | 1.531 | 1.535 | 1.535 | 1.535 |
| (10) | 1.894 | 0.953 | 1.955 | 7.465 | 0.607 | 0.525 | 0.192 |
| (11) | 1.729 | 1.729 | 1.618 | 1.697 | 1.911 | 1.911 | 1.729 |
| (12) | 1.900 | 1.900 | 1.852 | 1.835 | 1.871 | 1.871 | 1.755 |
| (13) | 0.160 | 0.261 | 0.248 | 0.136 | 0.109 | 0.109 | 0.017 |
| (14) | 2.630 | 1.567 | 2.146 | 2.366 | 1.901 | 1.919 | 2.583 |

Image Pickup Apparatus

Figure 15:
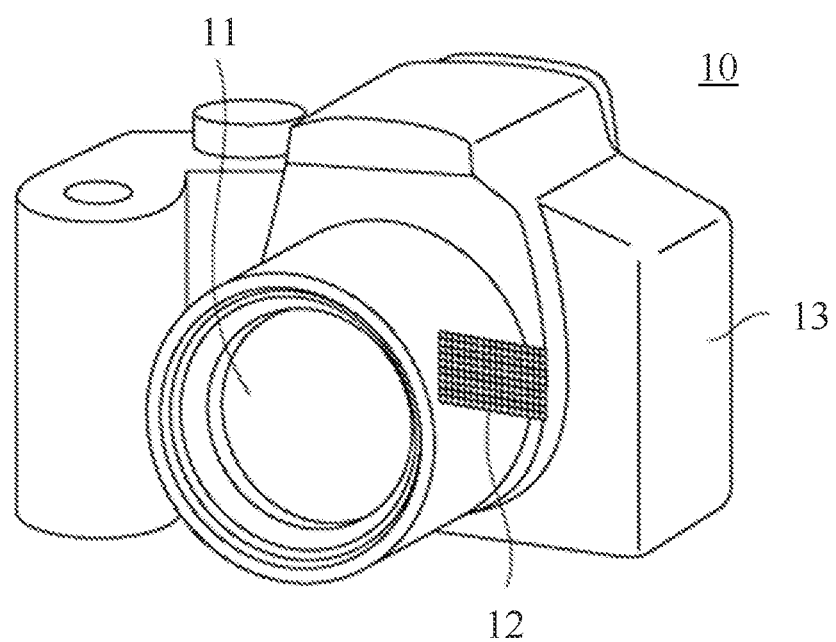
FIG. 15 is a schematic diagram of an image pickup apparatus.

Referring now to FIG. 15, a description will now be given of an example of a digital still camera 10 (image pickup apparatus) using the optical system L0 according to the disclosure as an imaging optical system. In FIG. 15, reference numeral 13 denotes a camera body, and reference numeral 11 denotes an imaging optical system that includes one of the optical systems L0 described in Examples 1 to 7. Reference numeral 12 denotes a solid-state image sensor (photoelectric conversion element) such as a CCD sensor or CMOS sensor, which is built in the camera body 13 and receives and photoelectrically converts an optical image formed by the imaging optical system 11. The camera body 13 may be a so-called single-lens reflex camera having a quick turn mirror, or a so-called mirrorless camera without a quick turn mirror.

Applying the optical system L0 of the disclosure to an image pickup apparatus such as a digital still camera can provide an image pickup apparatus having a compact lens.

While the disclosure has been described with reference to embodiments, it is to be understood that the disclosure is not limited to the disclosed embodiments. The scope of the following claims is to be accorded the broadest interpretation so as to encompass all such modifications and equivalent structures and functions.

This application claims the benefit of Japanese Patent Application No. 2022-046855, filed on Mar. 23, 2022, which is hereby incorporated by reference herein in its entirety.

The invention claimed is:

1. An optical system consisting of, in order from an object side to an image side, a front unit, an aperture stop, and a rear unit that has positive refractive power as a whole, wherein the rear unit includes a final lens disposed closest to an image plane and having positive refractive power, and wherein the following inequalities are satisfied:

$0.5 < TTL/\Phi i < 1.4$ $1.64 < PNdave < 2.00$ $2.0 < \Phi p/sk < 4.0$ where TTL is a distance on an optical axis from a lens surface on an object side of a lens disposed closest to an object in the optical system to the image plane, Φi is a diameter of an image circle, PNdave is an average value of refractive indices for d-line of all positive lenses included in the optical system, Φp is an effective diameter of a lens surface on the image side of the final lens, and sk is an air conversion length of a distance on the optical axis from the lens surface on the image side of the final lens to the image plane.

2. The optical system according to claim 1, wherein the following inequality is satisfied:

$$0.1 < f/|fa| < 1.5$$

where fa is a focal length of the front unit, and f is a focal length of the optical system.

3. The optical system according to claim 1, wherein the following inequality is satisfied:

$$0.6 < fp/f < 6.0$$

where fp is a focal length of the final lens, and f is a focal length of the optical system.

4. The optical system according to claim 1, wherein the following inequality is satisfied:

$$0.1 < sk/f < 0.7$$

where f is a focal length of the optical system.

5. The optical system according to claim 1, wherein the following inequality is satisfied:

$$0.6 < SPIP/TTL < 1.0$$

where SPIP is a distance on the optical axis from the aperture stop to the image plane.

6. The optical system according to claim 1, wherein the rear unit includes at least four lenses.

7. The optical system according to claim 1, wherein the rear unit includes a negative lens disposed on the object side of the final lens.

8. The optical system according to claim 7, wherein the following inequality is satisfied:

$$0.0 < (R1+R2)/(R2-R1) < 50.0$$

where R1 is a paraxial radius of curvature of a lens surface on the object side of the negative lens, and R2 is a paraxial radius of curvature of a lens surface on the image side of the negative lens.

9. The optical system according to claim 7, wherein the following inequality is satisfied:

$$1.500 < Ndn < 4.1945/vdn + 1.520$$

where Ndn is a refractive index of the negative lens for the d-line, and vdn is an Abbe number of the negative lens based on the d-line.

10. The optical system according to claim 1, wherein the following inequality is satisfied:

$$0.10 < fb/|fa| < 10.00$$

where fa is a focal length of the front unit, and fb is a focal length of the rear unit.

11. The optical system according to claim 1, wherein the front unit includes a positive lens, and the following inequality is satisfied:

$$1.60 < Ndap < 2.00$$

where Ndap is a refractive index of the positive lens for the d-line.

12. The optical system according to claim 1, wherein the rear unit includes a positive lens, and the following inequality is satisfied:

$$1.60 < Ndbp < 2.00$$

where Ndbp is a refractive index of the positive lens for the d-line.

13. The optical system according to claim 12, wherein the rear unit includes a negative lens, and the following inequality is satisfied:

$$0.0 < Ndbp - Ndbn < 0.4$$

where Ndbn is a refractive index of the negative lens for the d-line.

14. The optical system according to claim 1, wherein the following inequality is satisfied:

$$1.0 < \Phi p/\Phi a < 4.0$$

where Φa is an effective diameter of the lens having a largest effective diameter in the front unit.

15. The optical system according to claim 1, wherein the optical system consists of 5 or more and 8 or less lenses.

16. The optical system according to claim 1, wherein the front unit consists of a single positive lens.

17. An image pickup apparatus comprising:
an optical system; and
an image sensor configured to receive an image formed by the optical system,
wherein the optical system consists of, in order from an object side to an image side, a front unit, an aperture stop, and a rear unit that has positive refractive power as a whole,
wherein the rear unit includes a final lens disposed closest to an image plane and having positive refractive power, and
wherein the following inequalities are satisfied:

$$0.5 < TTL/\Phi i < 1.4$$

$$1.64 < PNdave < 2.00$$

$$2.0 < \Phi p/sk < 4.0$$

where TTL is a distance on an optical axis from a lens surface on an object side of a lens disposed closest to an object in the optical system to the image plane, Φi is a diameter of an image circle, PNdave is an average value of refractive indices for d-line of all positive lenses included in the optical system, Φp is an effective diameter of a lens surface on the image side of the final lens, and sk is an air conversion length of a distance on the optical axis from the lens surface on the image side of the final lens to the image plane.

* * * * *